April 28, 1964
R. McFARLAND, JR
3,130,954
VALVE DIAPHRAGM STRUCTURE
Filed April 28, 1960
3 Sheets-Sheet 1
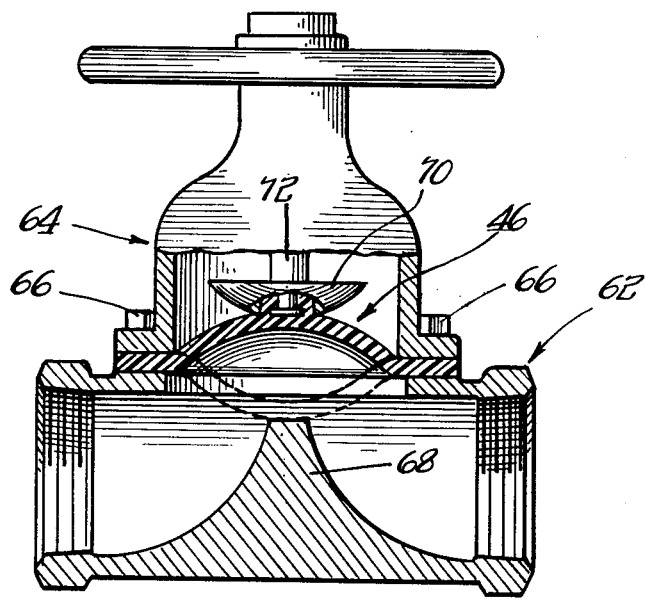
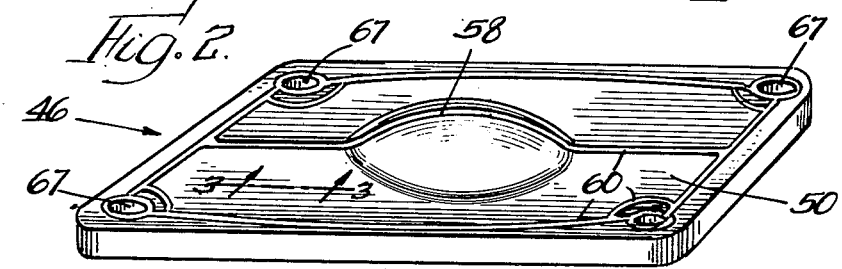
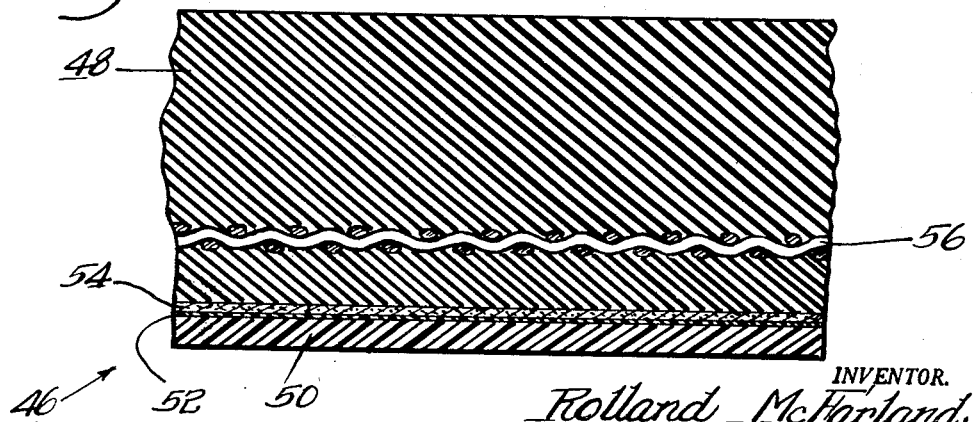
INVENTOR.
Rolland McFarland, Jr.
BY:
Olson & Trexler
attys.

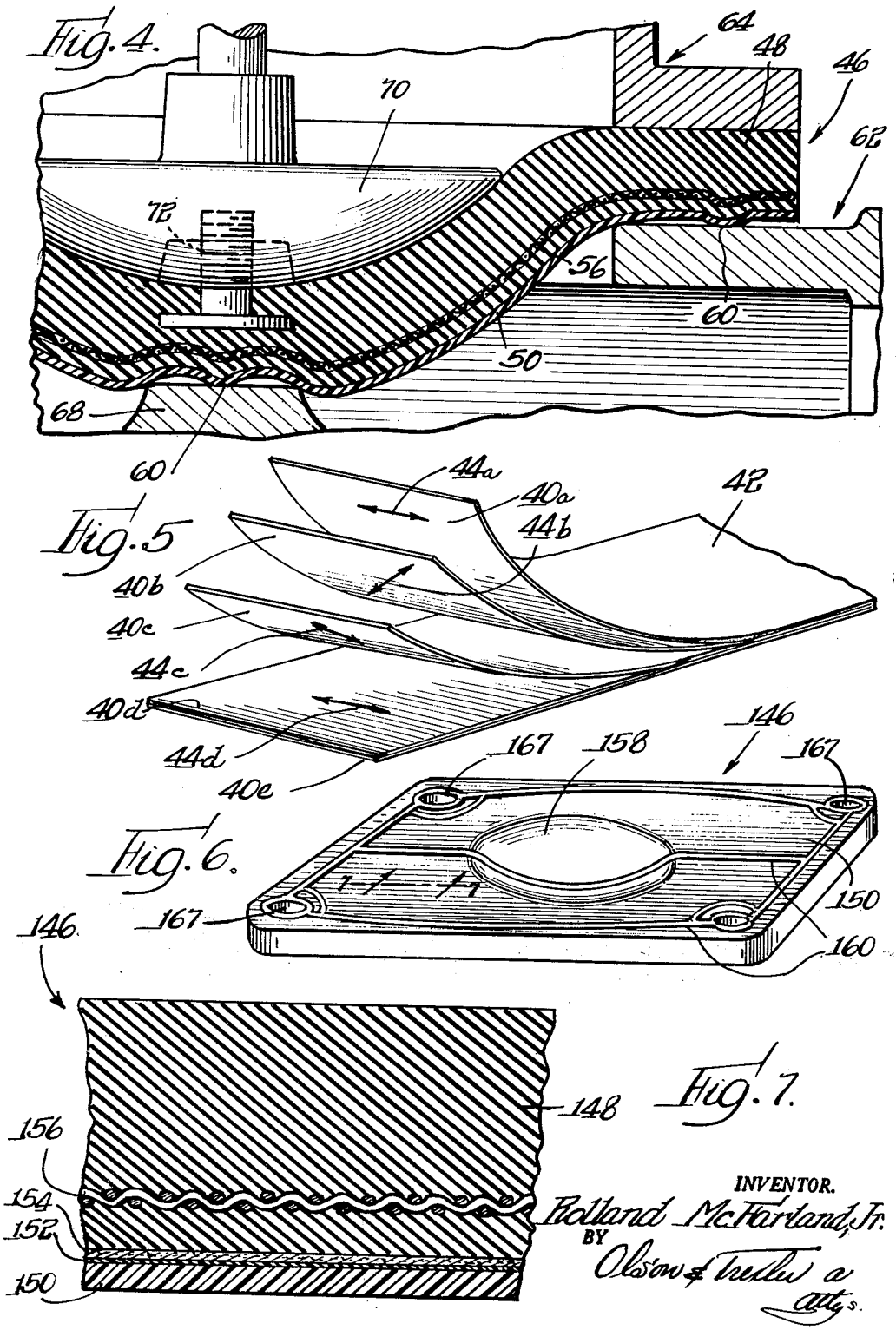

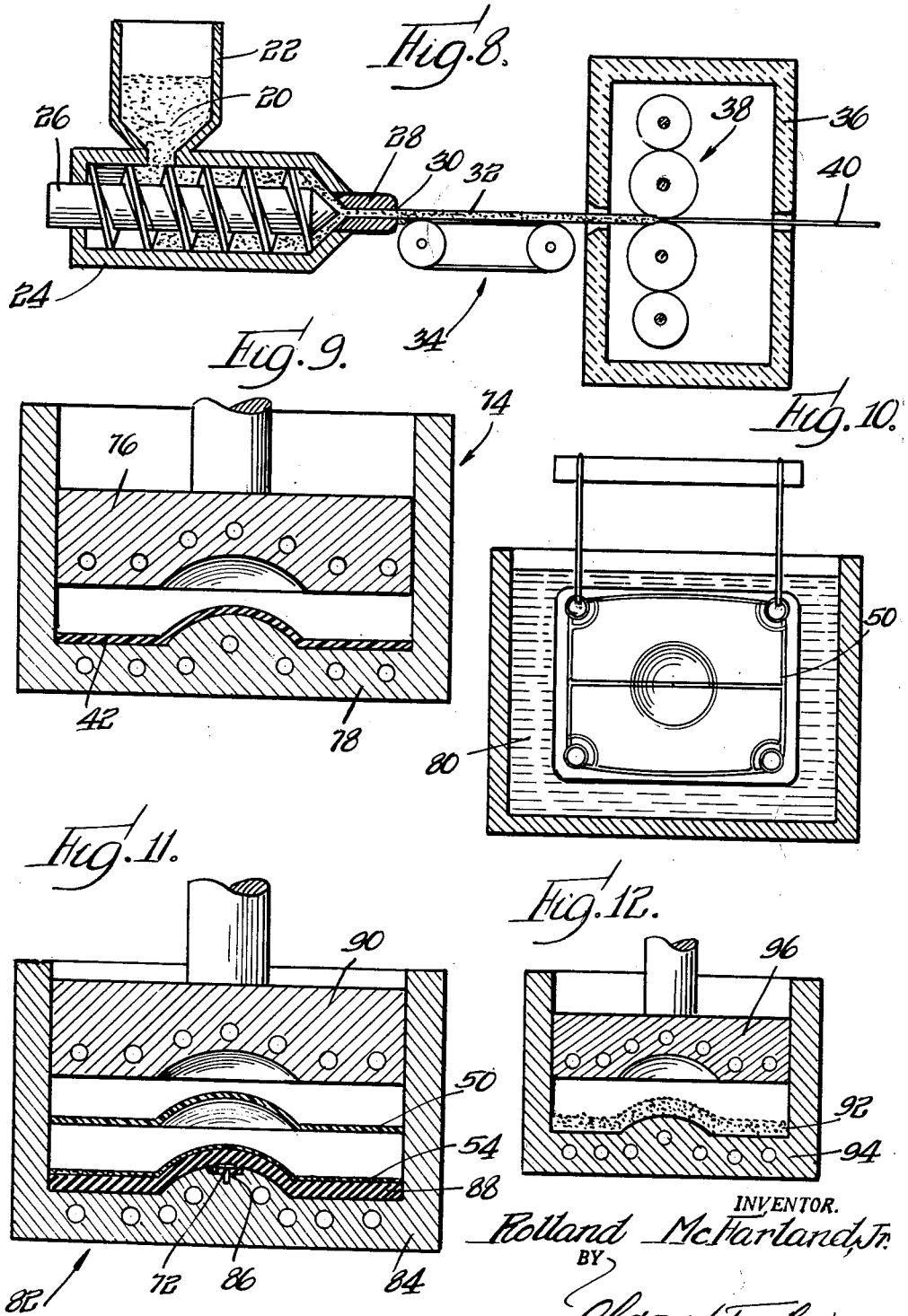

United States Patent Office 3,130,954
Patented Apr. 28, 1964

3,130,954
VALVE DIAPHRAGM STRUCTURE
Rolland McFarland, Jr., Crystal Lake, Ill., assignor to Hills-McCanna Company, Chicago, Ill., a corporation of Illinois
Filed Apr. 28, 1960, Ser. No. 25,255
5 Claims. (Cl. 251—331)

This invention relates generally to valve diaphragm structures and more particularly to valve diaphragm structures that are adapted for flexing in a valve assembly between an open position and a closed position tightly compressed against a valve seat.

In one specific aspect, the present invention relates to a valve diaphragm structure which is exposed to strongly corrosive fluids in use and which has its otherwise exposed surface covered with a film or sheet of polytetrafluoroethylene.

As used herein, the term "film" means materials provided in thicknesses up to and including 20 mils. For materials provided in thicknesses over 20 mils, the term "sheet" will be used.

Valve diaphragm structures of the type comprising an elastomeric body member surfaced with a polytetrafluoroethylene liner member are known and have been used extensively. However, certain problems have become apparent as experience in the use of these valve diaphragm structures has accumulated. It is well known that the tensile strength and percentage elongation of the elastomer used for the body member greatly exceed the corresponding properties of the polytetrafluoroethylene heretofore used for the liner member; and these rather substantial differences have, in particular, stimulated a search for component materials possessed of a more desirable combination of physical properties.

Accordingly, a general object of the present invention is to provide a new and improved valve diaphragm structure.

Another object of the invention is to provide a valve diaphragm structure, the elements of which display a highly desirable combination of physical properties.

Yet another object of the invention is to provide a valve diaphragm structure in which the extensibility of the liner member approximates that of the body member.

A further object of the invention is to provide a valve diaphragm structure which is characterized by a very long use-life.

A still further object of the invention is to provide a valve diaphragm structure in which the liner member affords an extremely high degree of protection for the body member.

And a still further object of the invention is to provide a valve diaphragm structure which is characterized by great ultimate strength.

Additional objects and features of the invention pertain to the particular structures, arrangements and materials whereby the above objects are attained.

In the past, valve diaphragm structures adapted for flexing in a valve assembly between an open position and a closed position tightly compressed against a valve seat have been desirably constructed as is shown and described in my U.S. Patent No. 2,615,471 granted on October 28, 1952, and entitled "Valve Diaphragm." Diaphragm structures of this type have been fabricated from various kinds of elastomeric materials, for example natural rubber, polychloroprene, butadiene-acrylonitrile copolymers, isobutylene-isoprene copolymers and the like, depending upon the nature of the fluid to which the diaphragm was to be exposed in service. These elastomeric materials are characterized by having rather specific chemical resistance; and it, therefore, has not proved feasible to supply unsurfaced, valve diaphragm structures in one or even a few different materials in order to contain satisfactorily the wide gamut of corrosive fluids encountered in modern industry.

To simplify the problem of selecting a material for valve diaphragm construction in accordance with each specific application, a highly inert, resinous material has been applied as a surface covering to the more conventional, elastomeric diaphragm. Polytetrafluoroethylene was found to be eminently suited for this purpose; however, polytetrafluoroethylene was also found to be difficulty adherable to the elastomeric substrate; and originally, composition valve diaphragms employed various mechanical schemes for retaining the polytetrafluoroethylene film or sheet against a contoured, elastomeric diaphragm surface. One successful composition diaphragm of this type is described and claimed in my U.S. Patent No. 2,918,089 granted December 22, 1959, and entitled "Diaphragm Assembly."

More recently, a technique has been developed for chemically activating the surface of a polytetrafluoroethylene film or sheet so that it could be bonded to numerous types of substrates. This technique is now employed in producing valve diaphragm structures in which the polytetrafluoroethylene liner member is intimately associated with the elastomeric body member in accordance with the disclosure of my co-pending U.S. patent application, Serial No. 563,554, filed February 6, 1956, now Patent No. 2,947,325 issued August 2, 1960 and entitled "Valve Diaphragm and Method of Making the Same." It has been found that the ultimate utility of composition diaphragms of the type described therein is limited by the general quality and attainable physical properties of the polytetrafluoroethylene film or sheet that is employed as the protective covering for the valve diaphragm structure.

Heretofore, polytetrafluoroethylene films of limited size and thickness have been produced by continuous, compacting, sintering and rolling operations. Film having minimum porosity, tensile strength approximating 4,000 p.s.i. and elongations of 100 to 150% has resulted. However, when films of over 10 mil thickness or sheets were desired, it was common to skive a continuous layer from a solid cylinder or billet of polytetrafluoroethylene, the cylinder or billet having been previously compacted, sintered and coined to produce a unit displaying as much density and as uniform properties as possible.

In the manufacture of thick films or sheets by the skived sheet process, the cylinder or billet is mounted on trunnions for rotation, and a skiving knife is caused to contact the side of the cylinder so that a thick film or sheet is continuously cut from the cylindrical surface in much the same manner as veneer laminations are cut from wood billets.

Because of inherent variations in the structure of the original, polytetrafluoroethylene billets, the physical properties of skived sheets vary as the center of a billet is approached in the skiving operation. In addition, the skiving knives themselves cannot be honed to a perfectly sharp edge; and the discontinuities and irregularities occurring at the apex of the skiving knife give rise to flaws or lines of incipient failure. As the film or sheet is cut from the polytetrafluoroethylene billet, the microscopic discontinuities and irregularities of the knife edge are reproduced on the surface of the sheet or film itself and are as characteristic of the skiving process as are the rifling marks discernible on a fired projectile. These lines of incipient failure result in a visual pattern of striations traversing the skived film or sheet in the direction in which the billet was rotated; and skived sheet or film is known to tear preferentially along these striations. While thicker sheet is obviously more resistant to splitting or tearing along the skive marks, it is impossible to overcome completely these inherent weaknesses even though a sheet as thick as 0.065 inch or more be cut from the billet.

Having thus described the state of the prior art, I intend now to describe my present invention, the structure and mode of operation of which will be better understood by reference to the following disclosure and drawings forming a part thereof, wherein:

FIG. 1 is a side elevational view in partial cross-section of a valve assembly incorporating a diaphragm structure in accordance with the invention, the open position of the valve being shown in solid outline and the closed position of the valve being indicated in broken outline;

FIG. 2 is a perspective view of a valve diaphragm structure in accordance with the invention;

FIG. 3 is an enlarged view taken through the section 3—3 of FIG. 2;

FIG. 4 is an enlarged, fragmentary, cross-sectional view of the valve of FIG. 1, showing the valve in its closed position;

FIG. 5 is a perspective view of a built-up sheet of polytetrafluoroethylene showing the various plies peeled back, which sheet may be used in forming the liner member of the valve diaphragm structure indicated in FIG. 2;

FIG. 6 is a perspective view of another embodiment of the valve diaphragm structure of the invention;

FIG. 7 is an enlarged view taken through the section 7—7 of FIG. 6;

FIG. 8 is a schematic view of processing equipment used for producing the polytetrafluoroethylene film which is employed as the individual plies in the sheet shown in FIG. 5;

FIG. 9 is a schematic showing of the formation of a valve diaphragm liner member from the sheet of FIG. 5;

FIG. 10 shows treating of the liner member for chemically activating the surface thereof;

FIG. 11 shows bonding of a liner member to an elastomeric body member in the production of a valve diaphragm structure in accordance with the invention; and FIG. 12 illustrates another method of forming a liner member for the valve diaphragm structure of the invention.

A valve diaphragm structure fashioned in accordance with an important embodiment of the invention includes a liner member made from a polytetrafluoroethylene element which is possessed of unusually high tensile strength and elongation. Specific samples of this special polytetrafluoroethylene have displayed tensile strengths averaging 7,000 p.s.i. and elongations of 450% or more. This compares with a tensile strength of about 4000 p.s.i. and elongations of approximately 150% for skived sheet process polytetrafluoroethylene. Moreover, this special polytetrafluoroethylene element is substantially isotropic, i.e. its physical properties register approximately the same values in all directions.

Referring more specifically now to FIG. 8, finely divided polytetrafluoroethylene resin 20 is shown to be fed from a bin or hopper 22 through a cylinder 24 by means of a rotating screw 26. The cylinder 24 terminates at one end in an extrusion die 28 which defines a transversely elongated, slot-like nozzle 30. Because of the extreme pressures applied to the resin 20 by the screw 26, the resin emerges from the nozzle 30 as a continuous, highly compacted, extruded film 32. This compact-extruded film 32 displays appreciable handability and good physical properties even in an unsintered state. In addition, the film 32 has been produced in useful widths up to 24 inches. The resin 20 is commonly compact-extruded without the application of supplementary heat in forming the film 32.

In order to maximize the physical properties of the film 32, a conveyor system indicated generally at 34 is provided for directing the film 32 from the nozzle 30 to a sintering furnace 36. Within the furnace 36, the film 32 is heated to its fusion or gelation condition and is continuously coined as by means of a mill 38. From the furnace 36, there emerges a sintered and coined film 40 which displays unusually high physical properties, is extremely dense and is characterized by minimum porosity. The film 40 is customarily produced in thicknesses of 5–8 mils.

Since the film 40 is known to possess a certain degree of orientation of its physical properties, i.e. its physical properties register somewhat greater values longitudinally than transversely, a number of the films 40 are advantageously compounded or laid in courses in super-position to be sintered or fused together forming a unitary, built-up sheet or thick film. Several films 40 are ordinarily fed continuously into a final sintering-compacting mill, not shown, to produce the unitary sheet or thick film.

In FIG. 5, a unitary, built-up sheet 42 is shown comprised of a plurality of films 40a, 40b, 40c, 40d and 40e. Desirably, the several films 40 are superposed with their individual axes of physical property orientation sequentially disposed at a uniform angle relative to each other. One such desired angle of relative disposition of the axes of physical property orientation has been found to be 45 degrees. In FIG. 5, the axes of physical property orientation are indicated by the numeral 44 to which is affixed the appropriate suffix letter of the corresponding film 40.

Because of the processing history of the individual films 40 and because of the compounding of a plurality of the films 40, the sheet 42 is substantially more permeation resistant than thick films or sheets produced by the skived sheet process, the multiplicity of stratas or layers of individual films in the sheet 42 substantially reducing the probability of coincidence of two or more pin holes. In addition, the sheet 42 is more dense than thick films or sheets produced by the skived sheet process and is possessed of the unusually high tensile strength and elongation referred to hereinabove.

A valve diaphragm constructed in accordance with an important embodiment of the invention and incorporating a liner member fabricated from the polytetrafluoroethylene sheet 42 is shown in FIGS. 2 and 3. There, a diaphragm structure indicated generally by the numeral 46 will be seen to include a flexible, elastomeric body member 48 to which is secured a liner member 50. As is best shown in FIG. 2, the liner member 50 covers the sides as well as the exposed or working surface of the body member 48; and as is best shown in FIG. 3, the liner member 50 has a chemically activated surface portion 52 disposed confronting the body member 48. Between the chemically activated surface portion 52 and the body member 48 there is interposed a layer of adhesive 54 which is employed in bonding the liner member 50 to the body member 48 as will be described more fully hereinafter.

Elastomers used for the body member 48 typically possess tensile strengths of 2,000 p.s.i. and elongations of 300%. The polytetrafluoroethylene sheet 42 from which the liner member 50 is fabricated, on the other hand, displays tensile strengths of approximately 7,000 p.s.i. and elongations of about 450%. Thus, the liner member is actually stronger and more elastic than the body member; and the component which tends to limit the ultimate strength of the valve diaphragm structure 46 is the body member 48.

Accordingly, it has proved important to align a reinforcing member 56 within the body member 48, as shown; and highly organized systems of fibers such as woven fabrics have proved to be preferable embodiments of the reinforcing member 56. However, because of the substantial extensibility of both the liner member 50 and the body member 48, cotton duck fabric of the type commonly employed in reinforcing rubber parts has proved unsuitable for use as the reinforcing member 56, cotton fabric having proved to have good breaking strength but insufficient elongation. Rayon fabric having a breaking strength of approximately 3.5 grams per denier and a breaking elongation of approximately 23% has been found to be eminently useful for the reinforcing member 56.

Nylon fabric having a breaking strength of 6.5 grams per denier and a breaking elongation of approximately 60%, while ordinarily considered to have excessive elongation for use in conjunction with a polytetrafluoroethylene liner member in a composition valve diaphragm structure, can be usefully employed as the reinforcing member 56 of the present diaphragm structure 46. It is believed that the unusually high physical properties of the liner member 50 and the balance of physical properties between the liner member 50 and the body member 48 combine to permit utilization of the above described nylon fabric as one embodiment of the reinforcing member 56.

With particular reference to FIG. 2, the valve diaphragm structure 46 is shown to include a dome-shaped central portion 58 which is defined by correspondingly dome-shaped portions of the body member 48, the reinforcing member 56 and the liner member 50. Furthermore, the diaphragm structure 46 is preferably formed with the dome-shaped portion 58 disposed normally in the closed condition, i.e. with the normally convex surface of the dome-shaped portion 58 extending outwardly from the working surface of the diaphragm. As is also indicated in FIG. 2, the diaphragm structure 46 is desirably formed with rib means 60 projecting outwardly from the working face of the diaphragm; and these rib means 60 are arranged to traverse the periphery of the structure 46 and to bisect the dome-shaped portion 58. When the diaphragm 46 is assembled into a valve, as is best shown in FIG. 4, the rib means 60 provide an improved sealing effect where such is required.

The diaphragm structure 46 is intended to be assembled into a valve as is indicated in FIG. 1. There, the diaphragm 46 is clamped between a valve body 62 and a valve bonnet 64, as by means of bolts 66. The bolts 66 desirably pass through bolt holes 67 molded in the diaphragm 46. The valve body 62 defines a passageway which is partially blocked as by a valve seat 68; and the diaphragm structure 46 is adapted to be flexed between an open position indicated in solid outline and a closed position indicated in broken outline. A suitably actuated compressor 70 is provided for urging the diaphragm 46 against the valve seat 68; and advantageously, a stud 72 is molded into the body member 48 of diaphragm structure 46 for coupling the diaphragm structure to the compressor 70. The closed position of the diaphragm 46 is shown in somewhat greater detail in FIG. 4.

A more detailed description will now be given regarding the steps which have been taken in fabricating the valve diaphragm structure 46. With particular reference to FIG. 9, a portion of the sheet 42 will be seen to have been cut to the approximate size of a liner member. This pre-cut sheet is placed in a mold 74, and a plunger die 76 is urged toward a stationary die 78 compressing the pre-cut portion of sheet 42 therebetween. Heat is then applied to the mold whereby to form the sheet 42 into the desired shape of a liner member 50. Fusing together of individual films 40 while simultaneously forming the resultant thick film or sheet in mold 74 is also contemplated by the invention.

After the liner member has been molded, it is advantageously immersed in a solution 80 of liquid ammonia and sodium as shown in FIG. 10. The solution 80 reacts with the surface of the liner member 50 so as to provide it with a substantially monomolecular, chemically active or unsaturated surface.

Subsequently, the molded and surface-activated liner member 50 is assembled with the other components of the diaphragm in a mold 82 shown in FIG. 11. There, a stationary die 84 is provided with a recess 86 for receiving a portion of the lug 72 which is partially positioned, in accordance with one embodiment of the invention, in an unvulcanized preform 88 of the body member 48. A layer of adhesive 54 is laid over the preform 88, interposed between the preform and liner member 50. As will be recognized, the layer of adhesive 54 may be equally well applied to the confronting, chemically activated surface of liner member 50.

In compliance with an important feature of the invention, the liner member 50 is bonded to the body member 48 with a relatively high degree of adhesion, on the order of 12–16 pounds per lineal inch width peel strength. Therefore, it has proved preferable to employ as the adhesive 54 the material known commercially as "Typly S" manufactured by the Marbon Chemical Division of the Bork-Warner Corp., Chicago, Illinois, and available as a solution containing 35% solids in methyl ethyl ketone. In certain circumstances, peel strengths of less than two pounds per lineal inch width have been usefully employed.

After the liner member 50 has been assembled to the vulcanizable preform 88 with the layer of adhesive 54 disposed therebetween, a plunger die 90 is urged into the stationary die 84; and heat is applied to the assembly in order to vulcanize the preform 88 and bond the liner member 50 thereto. It is to be noted that, because of the chemically activated surface on the liner member 50, a chemical bond will be achieved between the body member 48 and the liner member 50.

Another valuable method of producing a liner member for the valve diaphragm structure of the invention is by what has been termed the "coined sheet process." In accordance with the procedures of this process, a suitable quantity of finely divided polytetrafluoroethylene resin 92 is sifted or dusted into a mold 94 as is illustrated in FIG. 12. The resin 92 is compacted under pressure from a plunger 96 until the particles agglomerate strictly from the application of pressure. Subsequently, the die 94 is heated in order to raise the compacted resin to its gelation point to sinter it. While the resin is in this fused state, plunger 96 is again employed to apply pressure to the gelling resin in order to coin it. While the fused resin is being subjected to pressure from plunger 96, heat is extracted from the mold 94 and the plunger 96 whereby to form the resin 92 into a finished liner member.

It is recognized that the sintering and coining of the resin 92 need not take place simultaneously with the formation of a liner member. It is also within the contemplation of the "coined sheet process" to form a separate, coined sheet and subsequently to hot form the coined sheet into a liner member.

With reference now to FIGS. 6 and 7, a valve diaphragm structure indicated generally by the numeral 146 will be seen fashioned with an elastomeric body member 148 and a liner member 150, the latter element being produced in compliance with the "coined sheet process." The liner member 150 is provided with a chemically activated surface portion 152 in accord with the methods hereinabove described. Likewise, a layer of adhesive 154 is interposed between the chemically active surface portion 152 and the body member 148 for bonding the liner member 150 to the body member 148.

In further compliance with the present invention, a reinforcing member 156 is aligned within the body member 148; and since the liner member 150, fabricated from "coined sheet process" polytetrafluoroethylene sheet, is not possessed of the extremely high physical properties which the sheet 42 is possessed of, the reinforcing member 156 has desirably taken the form of a woven rayon fabric having a breaking strength of approximately 3.5 grams per denier and a breaking elongation of approximately 23%. Use of such a rayon fabric for the reinforcing member 156 has been found substantially to prevent rupture of the liner member 150 at areas of the diaphragm structure 146 which are highly stressed in use.

The diaphragm structure 146 is arranged with a dome-shaped central portion 158; and as is shown in FIG. 6, the dome-shaped portion 158 can be provided in a "molded open configuration," i.e. with the normally concave surface of the dome-shaped portion defined by the exterior surface of liner member 150. In addition, ribs 160 may be upraised from the outer surface of liner member 150 as has been hereinabove described. Furthermore, bolt holes 167 have been advantageously provided.

While particular embodiments of the invention have been shown, it should be understood, of course, that the present invention is not limited thereto since many modifications may be made; and it is, therefore, contemplated to cover by the appended claims any such modifications as fall within the true spirit and scope of the invention.

The invention is claimed as follows:

1. A valve diaphragm structure adapted for flexing in a valve assembly between an open position and a closed position tightly compressed against a valve seat, said structure comprising: a flexible, elastomeric body member; a polytetrafluoroethylene liner member disposed against said body member, said liner member having a tensile strength and an elongation at least equal to the corresponding properties of said body member; and means bonding said liner member to said body member with a high degree of adhesion.

2. A valve diaphragm structure adapted for flexing in a valve assembly between an open position and a closed position tightly compressed against a valve seat, said structure comprising: a flexible, elastomeric body member; a polytetrafluoroethylene liner member disposed against said body member, said liner member including a plurality of individual lamina superimposed upon one another with their axes of physical property orientation disposed at a uniform angle relative to each other, said lamina being fused together to form a substantially isotropic member having a tensile strength and an elongation at least equal to the corresponding properties of said body member; and means bonding said liner member to said body member with a uniformly high degree of adhesion.

3. A valve diaphragm structure adapted for flexing in a valve assembly between an open position and a closed position tightly compressed against a valve seat, said structure comprising: a flexible, elastomeric body member; a polytetrafluoroethylene liner member disposed against said body member, said liner member having a tensile strength and an elongation greater than the corresponding properties of said body member; a reinforcing member in said body member, said reinforcing member having comparatively high breaking strength and elongation whereby to develop physical properties in said body member closely approximating those of said liner member; and means bonding said liner member to said body member with a high degree of adhesion.

4. A valve diaphragm structure according to claim 3 wherein said reinforcing member is a rayon fabric.

5. A valve diaphragm structure according to claim 3 wherein said reinforcing member is a nylon fabric.

References Cited in the file of this patent

UNITED STATES PATENTS

| | | |
|---|---|---|
| 2,067,025 | Schmidt | Jan. 5, 1937 |
| 2,422,529 | Coffey | June 17, 1947 |
| 2,615,471 | McFarland | Oct. 28, 1952 |
| 2,705,691 | Panagrossi et al. | Apr. 5, 1955 |
| 2,710,629 | Price | June 14, 1955 |
| 2,781,552 | Gray | Feb. 19, 1957 |
| 2,809,130 | Rappaport | Oct. 8, 1957 |
| 2,886,480 | Deakin | May 12, 1959 |
| 2,947,325 | McFarland | Aug. 2, 1960 |
| 2,964,065 | Haroldson | Dec. 13, 1960 |